(12) United States Patent
Helstern

(10) Patent No.: US 7,984,933 B2
(45) Date of Patent: *Jul. 26, 2011

(54) MULTI-USE TORQUE FITTING AND COMPRESSIBLE FERRULE

(75) Inventor: Gary C. Helstern, Newtown, CT (US)

(73) Assignee: Diba Industries, Inc., Danbury, CT (US)

( * ) Notice: Subject to any disclaimer, the term of this patent is extended or adjusted under 35 U.S.C. 154(b) by 332 days.

This patent is subject to a terminal disclaimer.

(21) Appl. No.: 12/039,039

(22) Filed: Feb. 28, 2008

(65) Prior Publication Data

US 2009/0218813 A1 Sep. 3, 2009

(51) Int. Cl.
*F16L 25/00* (2006.01)
(52) U.S. Cl. ......... 285/362; 285/359; 285/395; 285/379
(58) Field of Classification Search .................. 285/36, 285/92, 359, 362, 394, 395, 922, 347, 349, 285/379; 464/37; 411/7; 439/321
See application file for complete search history.

(56) References Cited

U.S. PATENT DOCUMENTS

| | | | |
|---|---|---|---|
| 0,345,314 A | | 7/1886 | McMillan |
| 1,518,634 A | | 12/1924 | Carson, Jr. |
| 1,574,052 A | * | 2/1926 | Mueller .................. 277/622 |
| 1,621,583 A | | 3/1927 | Creighton |
| 2,021,745 A | * | 11/1935 | Pfefferle et al. .............. 277/607 |
| 2,258,528 A | * | 10/1941 | Wurzburger ................. 285/341 |
| 2,437,632 A | * | 3/1948 | Wolfram ..................... 285/342 |
| 2,912,262 A | * | 11/1959 | Franck ....................... 285/231 |
| 2,935,343 A | * | 5/1960 | Ellis .......................... 285/95 |
| 3,075,792 A | * | 1/1963 | Franck .................... 285/148.27 |
| 3,287,031 A | | 11/1966 | Simmons et al. |
| 3,425,314 A | | 2/1969 | Ohlson |
| 3,718,065 A | | 2/1973 | Liber |
| 3,937,121 A | | 2/1976 | Schubert |
| 4,030,798 A | * | 6/1977 | Paoli ......................... 439/321 |
| 4,268,103 A | * | 5/1981 | Schildkraut et al. ......... 439/321 |
| 4,844,570 A | | 7/1989 | Tanabe |
| 4,930,951 A | | 6/1990 | Gilliam |
| 5,000,721 A | | 3/1991 | Williams |

(Continued)

FOREIGN PATENT DOCUMENTS

DE 4442075 C1 6/1996

OTHER PUBLICATIONS

International Search Report and Written Opinion pertaining to International application No. PCT/US2009/035086 dated Oct. 8, 2009.

(Continued)

*Primary Examiner* — James M Hewitt
(74) *Attorney, Agent, or Firm* — Dinsmore & Shohl, LLP

(57) ABSTRACT

An assembly comprises a multi-use torque fitting, a length of tubing, and a compressible ferrule, wherein the assembly is configured to couple an end of the length of tubing to a port of a fluid-handling device in a hermetically sealed or substantially leak-proof manner. Generally, the fitting is configured to provide a degree of compression to the compressible ferrule sufficient to prevent fluid leakage at the ferrule/port interface. This fitting generally comprises a threaded body portion and a torque-limiting body portion, wherein the threaded body portion and the torque-limiting body portion are arranged concentrically along a longitudinal axis of the fitting.

23 Claims, 7 Drawing Sheets

U.S. PATENT DOCUMENTS

| | | | |
|---|---|---|---|
| 5,145,394 A * | 9/1992 | Hager | 439/321 |
| 5,183,140 A | 2/1993 | Nicoll | |
| 5,192,219 A * | 3/1993 | Fowler et al. | 439/321 |
| 5,215,336 A * | 6/1993 | Worthing | 285/81 |
| 5,295,831 A | 3/1994 | Patterson et al. | |
| 5,694,629 A | 12/1997 | Stephenson, III et al. | |
| 5,810,533 A | 9/1998 | Nakamura | |
| 5,823,702 A * | 10/1998 | Bynum | 403/320 |
| 6,019,708 A | 2/2000 | Kaminski et al. | |
| 6,036,421 A | 3/2000 | Demaray | |
| 6,220,415 B1 | 4/2001 | Cosenza | |
| 6,244,804 B1 | 6/2001 | Hodge | |
| 6,270,302 B1 | 8/2001 | Lyons | |
| 6,439,091 B1 | 8/2002 | Dibbern et al. | |
| 6,499,358 B1 | 12/2002 | Hogan et al. | |
| 6,899,358 B2 * | 5/2005 | Richardson | 285/354 |
| 7,032,931 B2 * | 4/2006 | Austin | 285/92 |
| 7,299,725 B2 | 11/2007 | Helstern et al. | |
| 7,571,937 B2 * | 8/2009 | Patel | 285/92 |
| 2004/0036292 A1 * | 2/2004 | Austin | 285/390 |
| 2006/0025224 A1 | 2/2006 | Saeki et al. | |
| 2007/0254744 A1 | 11/2007 | Helstern | |
| 2008/0194338 A1 * | 8/2008 | Helstern | 464/37 |

OTHER PUBLICATIONS

Examination Report pertaining to European Patent Application No. 07 755 038.2 dated Oct. 27, 2009.

Chinese Office Action pertaining to Application No. 200780015196.X dated Jan. 8, 2010.

U.S. Non-Final Office Action pertaining to U.S. Appl. No. 12/045,071 dated Dec. 13, 2010.

U.S. Office Action pertaining to U.S. Appl. No. 12/045,071 dated Oct. 28, 2010.

U.S. Election/Restriction pertaining to U.S. Appl. No. 12/045,071 dated Aug. 12, 2010.

U.S. Non-Final Office Action pertaining to U.S. Appl. No. 12/045,071 dated Sep. 23, 2010.

* cited by examiner

MULTI-USE TORQUE FITTING AND COMPRESSIBLE FERRULE

BACKGROUND OF THE INVENTION

Embodiments of the present invention generally relate to assemblies comprising a torque fitting, a length of tubing, and a compressible ferrule used to secure an end of the length of tubing to a port of a fluid manifold, a fluid valve assembly, a fluid container, or other type of fluid-handling device in a substantially leak-proof manner. Generally, the configuration of the fitting prevents over-tightening or over-compression of the compressible ferrule compressed between the fitting and the fluid-handling device to which the assembly is applied while ensuring sufficient compression of the ferrule between the fitting and the port of the fluid-handling device.

BRIEF SUMMARY OF THE INVENTION

In accordance with one embodiment of the present invention, the torque fitting comprises a threaded body portion, a torque-limiting body portion, and a channel. The threaded body portion and the torque-limiting body portion typically are arranged substantially concentrically along a longitudinal axis of the fitting. The channel is oriented along this longitudinal axis of the fitting and defines a cross-sectional area sufficient to accommodate a length of tubing along the axis. The threaded body portion comprises a compressing edge on the underside of the threaded body portion and a mechanical thread defining a compressive direction of rotation and a decompressive direction of rotation.

The threaded body portion and the torque-limiting body portion are configured such that when torque below a threshold level is applied to the torque-limiting body portion, rotation of the torque-limiting body portion in the compressive direction of rotation forces the threaded body portion to rotate with the torque-limiting body portion. Further, the threaded body portion and the torque-limiting body portion generally are configured such that when torque above the threshold level is applied to the torque-limiting body portion, rotation of the torque-limiting body portion in the compressive direction of rotation fails to force the threaded body portion to rotate with the torque-limiting body portion.

The threaded body portion and the torque-limiting body portion generally are further configured such that the rotation of the torque-limiting body portion in the decompressive direction of rotation forces the threaded body portion to rotate with the torque-limiting body portion, regardless of the level of torque applied to the body portion.

The length of tubing is accommodated by the channel of the torque fitting. The compressible ferrule is applied to an end of the length of tubing such that the compressible ferrule is positioned to cooperate with the torque fitting to prevent substantial fluid leakage when the assembly is applied to a fluid-handling device.

In accordance with another embodiment of the present invention, threaded body portion comprises a compressing edge on the underside of the threaded body portion. One of the threaded body portion or the torque-limiting body portion of the fitting comprises a lever, while the other body portion comprises an abutment. The lever comprises a first arresting surface and a yielding surface, while the abutment comprises a second arresting surface and an engaging surface. The lever and the abutment are configured such that the yielding surface of the lever and the engaging surface of the abutment engage when torque below a threshold level is applied in rotating the torque-limiting body portion in a compressive direction of rotation. The lever and the abutment are further configured such that the engaging surface contacts the yielding surface and sufficiently deflects the lever to allow the lever to bypass the abutment when torque above the threshold level is applied in rotating the torque-limiting body portion in the compressive direction of rotation. This deflection of the lever by the abutment causes the lever to flex toward the body portion comprising the lever and away from the body portion comprising the abutment. The lever preferably is configured with a degree of elasticity sufficient to enable repetitive flexion of the lever. Meanwhile, the first and second arresting surfaces are configured to arrest relative rotation between the threaded body portion and the torque-limiting body portion when engaged. This engagement of the first and second arresting surfaces forces the threaded body portion to rotate with the torque-limiting body portion when torque is applied to the torque-limiting body portion in a decompressive direction of rotation. The length of tubing is accommodated by the channel of the torque fitting. The compressible ferrule is applied to an end of the length of tubing such that the compressible ferrule is positioned to cooperate with the torque fitting to prevent substantial fluid leakage when the assembly is applied to a fluid-handling device.

Accordingly, it is an object of the present invention to present an assembly comprising a multi-use torque fitting, a length of tubing, and a compressible ferrule that may be used to couple the length of tubing to a fluid-handling device. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 10:
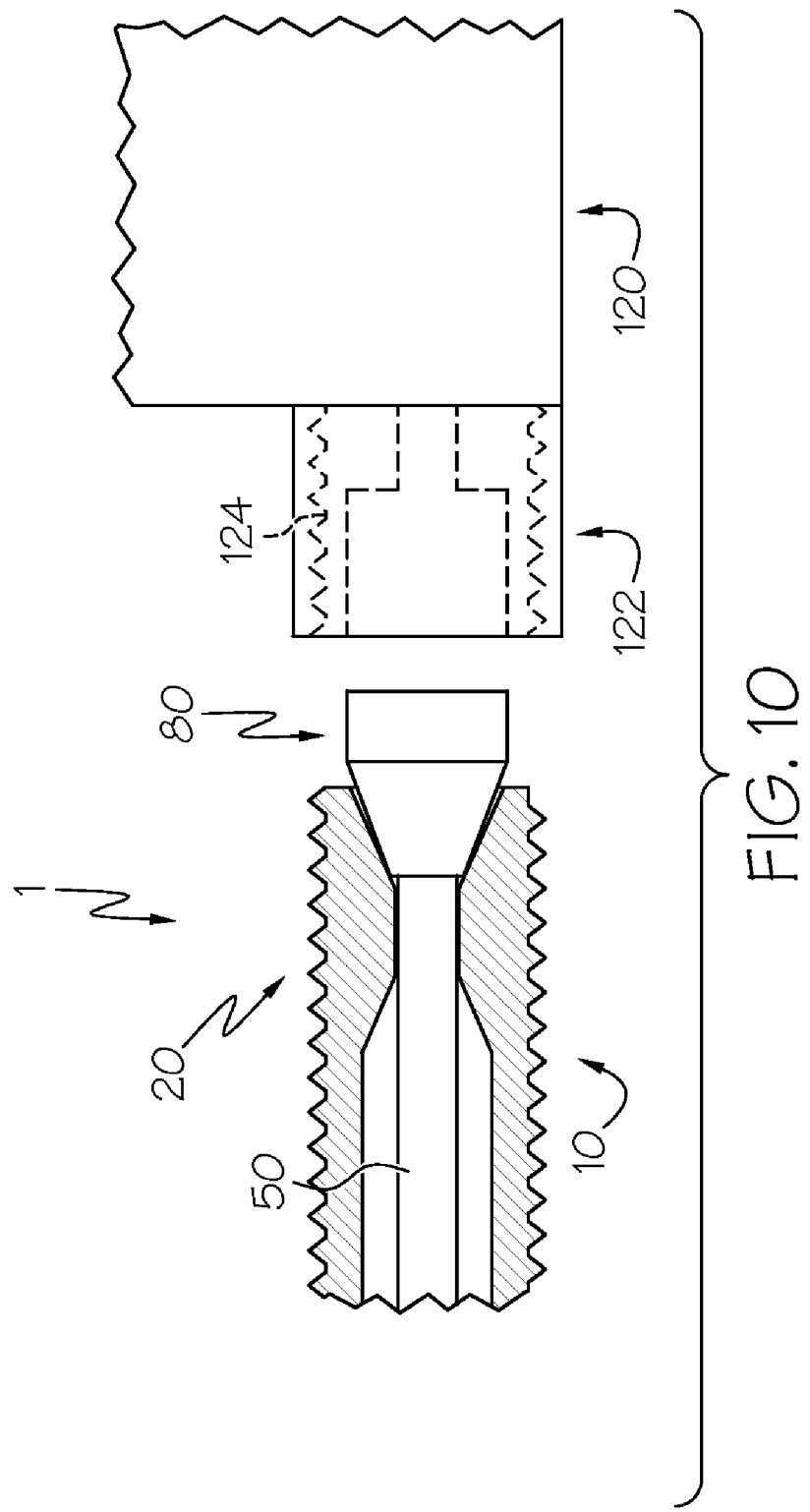
FIG. 10 is an illustration of another embodiment of an assembly according to the present invention wherein the assembly comprises a fluid-handling device.

Generally, embodiments of the present invention relate to an assembly that comprises a torque fitting, a length of tubing, and a compressible ferrule. As shown in FIG. 10, the assembly 1 uses a torque fitting 10 and a compressible ferrule 80 to secure in a substantial leak-proof manner a length of tubing 50 to a port 122 of a fluid manifold, a fluid valve assembly, a fluid container, or other type of fluid-handling device 120. The compressible inverted cone ferrule 80 is shown in FIG. 10 for illustrative purposes only and it is contemplated that another compressible ferrule configured to secure in a substantial leak-proof manner a length of tubing 50 to a port 122 of a fluid-handling device 120 may replace the compressible inverted cone ferrule 80. Further, it is contemplated that, according to one embodiment, the assembly comprises a fluid-handling device comprising a port in addition to the fitting, the length of tubing, and the compressible ferrule. The compressible ferrule generally is positioned to cooperate with the torque fitting to prevent substantial fluid leakage at a ferrule/port interface.

Figure 2:
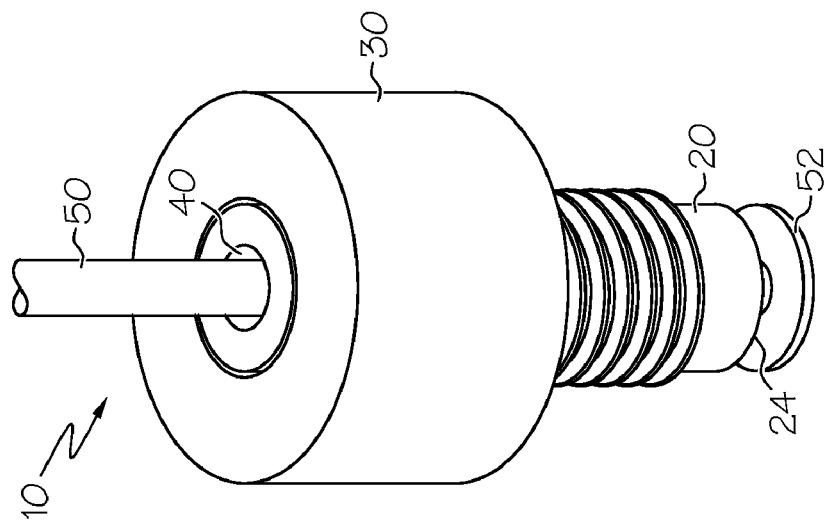
FIG. 2 is an illustration of an embodiment of a torque fitting and a length of tubing according to the present invention.
Figure 1:
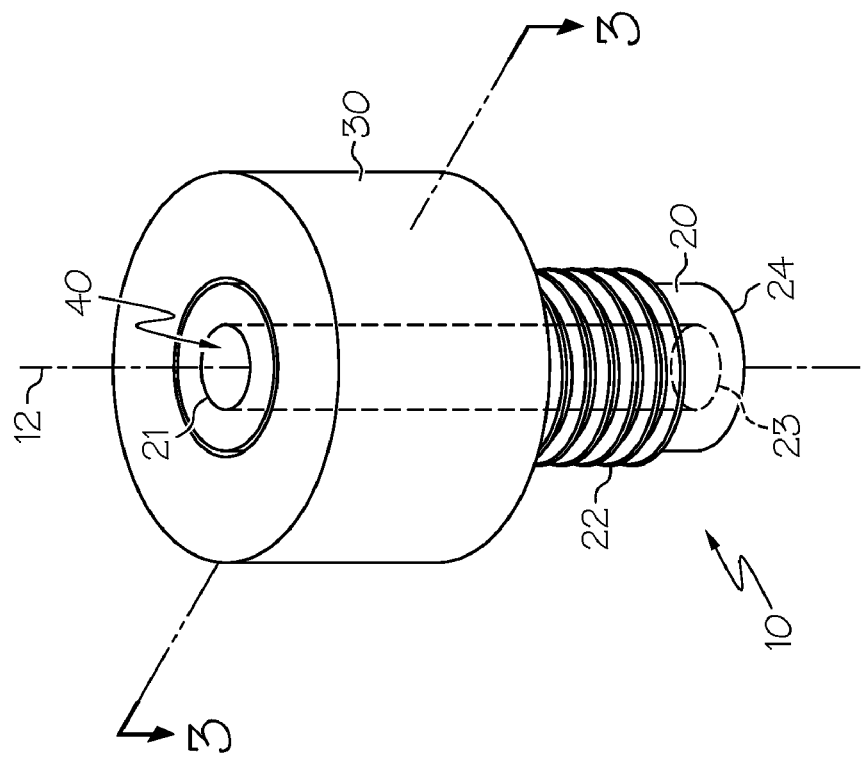
FIG. 1 is an illustration of an embodiment of a torque fitting according to the present invention comprising a threaded body portion, a torque-limiting body portion, and a channel.

Referring to FIGS. 1-5 and 11, the torque fitting 10 of assembly 1 generally comprises a threaded body portion 20, a torque-limiting body portion 30, and a channel 40. The threaded body portion 20 and the torque-limiting body portion 30 typically are arranged substantially concentrically along a longitudinal axis 12 of the fitting 10. The channel 40 is oriented along this longitudinal axis 12 of the fitting 10 and defines a cross-sectional area sufficient to accommodate a length of tubing 50 along this axis 12. As shown in FIG. 1, channel 40 of the torque fitting 10 extends through the torque fitting 10 from a first opening 21 defined in the threaded body portion 20 to a second opening 23 defined in the threaded body portion 20. The threaded body portion 20, meanwhile, generally comprises a mechanical thread 22 defining a compressive direction of rotation, as shown by the clockwise directional arrow depicted in FIGS. 3 and 4, and a decompressive direction of rotation, as shown by the counter-clockwise directional arrow depicted in FIG. 5.

As will be described in detail with FIGS. 3-5 and 11 below, the threaded body portion 20 and the torque-limiting body portion 30 generally are configured such that when torque below a threshold level is applied to the torque-limiting body portion 30, rotation of the torque-limiting body portion 30 in the compressive direction of rotation forces the threaded body portion 20 to rotate with the torque-limiting body portion 30. Therefore, the fitting 10 rotates in the compressive direction of rotation such that the fitting 10 may compress a compressible ferrule positioned between the fitting 10 and another object, e.g., a port of a fluid-handling device. When, however, torque above the threshold level is applied to the torque-limiting body portion 30, rotation of the torque-limiting body portion 30 in the compressive direction of rotation fails to force the threaded body portion 20 to rotate with the torque-limiting body portion 30. Here, as torque above the threshold level is applied, only the torque-limiting body portion 30 of the fitting 10 continues to rotate in the compressive direction of rotation, while the threaded body portion 20 fails to rotate, thereby precluding any further compression of the compressible ferrule. This configuration of the fitting 10 precludes substantial fluid leakage at a ferrule/port interface.

Fluid leakage at the ferrule/port interface and/or premature ferrule degradation may occur if a fitting is over-tightened or if the compressible ferrule is over-compressed. More specifically, the compressible ferrule may deform, crack, or otherwise degrade if too much compression is applied to it by the fitting. Alternatively, fluid leakage may occur if a fitting is under-tightened, resulting in an under-compression of the compressible ferrule. Additionally, over-compression of the compressible ferrule may occur if a fitting is over-tightened, resulting in disruption of fluid flow through the tubing. More particularly, if the compressible ferrule is over compressed, it compresses the tubing and reduces the diameter of the internal channel of the tubing, causing the disruption of fluid flow through the tubing.

The fitting 10 of the present invention, described in greater detail below, is configured to prevent over-compression of the ferrule while ensuring sufficient compression of the ferrule to prevent substantial fluid leakage. The configuration of the fitting 10 enables the torque-limiting body portion 30 to force the rotation of the threaded body portion 20 to a point where sufficient compression is applied to the compressible ferrule without compromising the integrity of the ferrule or allowing fluid to bypass the ferrule. The fitting 10 allows a user to rotate the torque-limiting body portion 30 in the compressive direction of rotation until it fails to force the threaded body portion 20 to rotate with the torque-limiting body portion 30. The fitting 10 is configured such that the appropriate amount of compression is reached at the point at which the torque-limiting body portion 30 fails to force the threaded body portion 20 to rotate with it in the compressive direction of rotation. This condition will be readily apparent to the user as a significant drop in rotational resistance in the torque-limiting body portion 30 will occur. As will be understood from the detailed description of the particular embodiment of the fitting presented below, the user may also note an audible click once the appropriate amount of compression is reached.

The threaded body portion 20 and the torque-limiting body portion 30 generally are further configured such that rotation of the torque-limiting body portion 30 in the decompressive direction of rotation forces the threaded body portion 20 to rotate with the torque-limiting body portion 30, regardless of the level of torque applied to the body portion 30. Therefore, the threaded body portion 20 and the torque-limiting body portion 30 both rotate together in the decompressive direction of rotation.

Figure 3:
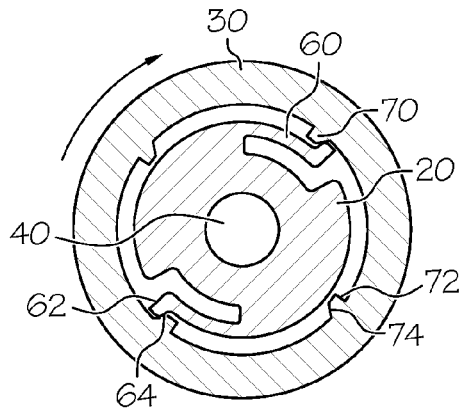
FIG. 3 is an illustration of an embodiment of a torque fitting according to the present invention wherein an engagement between an abutment and a lever forces the threaded body portion to rotate in a compressive direction of rotation with the torque-limiting body portion.

As depicted in FIGS. 3-5 and 11, the threaded body portion 20 comprises a lever 60 and the torque-limiting body portion 30 comprises an abutment 70. The lever 60 comprises a first arresting surface 62 and a yielding surface 64, while the abutment 70 comprises a second arresting surface 72 and an engaging surface 74. Referring to FIG. 3, the yielding surface 64 and the engaging surface 74 are configured to engage such that when torque below the threshold level is applied to the torque-limiting body portion 30, the engagement of the yielding surface 64 and the engaging surface 74 forces the threaded body portion 20 to rotate with the torque-limiting body portion 30. This condition remains until the appropriate amount of compression is applied to the compressible ferrule.

Figure 4:
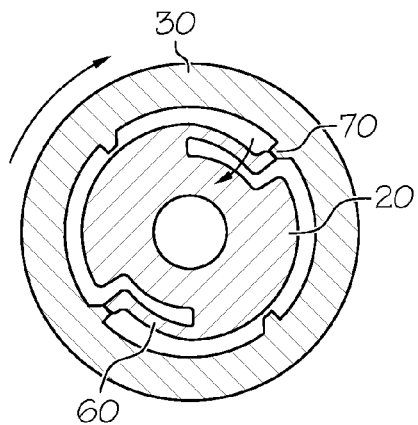
FIG. 4 is an illustration of an embodiment of a torque fitting according to the present invention wherein a deflection of the lever by the abutment fails to force the threaded body portion to rotate in a compressive direction of rotation with the torque-limiting body portion.

Specifically, as is illustrated in FIGS. 3 and 4, the engaging surface 74 contacts the yielding surface 64 and deflects the lever 60 when torque is applied in rotating the torque-limiting body portion 30 in the compressive direction of rotation. In the illustrated embodiment, this deflection of the lever 60 by the abutment 70 causes the lever 60 to flex toward the threaded body portion 20 and away from the torque-limiting body portion 30. The degree of this deflection will vary depending upon the torque applied in rotating the torque-limiting body portion 30 in the compressive direction of rotation. FIG. 3 illustrates a condition where the degree of deflection is minimal and, as such, the torque-limiting body portion 30 will force the threaded body portion 20 to rotate with it in the compressive direction of rotation. FIG. 4 illustrates a condition where the amount of torque applied to the torque limiting body portion has reached or exceeded a threshold level of torque. Under this condition, the torque-limiting body portion 30 will not force the threaded body portion 20 to rotate with it in the compressive direction of rotation because the lever 60 deflects an amount sufficient to allow the lever 60 to bypass abutment 70. The torque-limiting body portion 30 rotates substantially freely around the threaded body portion 20 in the compressive direction of rotation once the lever 60 has bypassed the abutment 70. The lever 60 is preferably provided with a degree of elasticity that is sufficient to enable repetitive deflection of the lever 60. As FIGS. 3 and 4 clearly show, when the lever 60 is deflected by flexing an amount sufficient to allow the lever 60 to bypass the abutment 70, there is no resultant change in the cross-sectional area of the channel 40.

The fitting 10 is configured such that the amount of compression applied to the compressible ferrule is established by the size and shape of the abutment 70 and the size, shape, and rigidity of the lever 60. Specific examples of means for tailoring the degree of torque that can be applied to the threaded body portion are given below. However, it is noted that those practicing the present invention should appreciate that a wide array of lever and abutment characteristics can be configured to tailor the amount of torque that can be applied to the threaded body portion.

For example, the rigidity of the lever 60, which can be a function of many factors (composition, size, shape, orientation, thickness, etc.), can be tailored to determine the amount of torque that can be applied to the threaded body portion 20 via the torque-limiting body portion 30. The less rigid the configuration of the lever 60, the lower the threshold level of torque applied. The more rigid the configuration of the lever 60, the higher the threshold level of torque applied. Once the threshold level of torque is exceeded, the engagement between the yielding surface 64 and the engaging surface 74 is lost such that the lever 60 bypasses the abutment 70 and no further compression can be applied to the compressible ferrule.

As a further example, the degree to which the abutment 70 protrudes from the otherwise uniform surface of the body portion carrying the abutment 70 and the degree to which the yielding surface 64 of the lever 60 extends into the corresponding depth dimension defined by the abutment 70 can also be tailored to determine the amount of torque that can be applied to the threaded body portion 20. As noted above, a given degree of deflection is required for the lever 60 to bypass the abutment 70. Those practicing the present invention can configure the fitting 10 to permit application of a relatively large degree of torque by providing a relatively large abutment 70 and configuring the lever 60 to protrude a relatively large extent into the depth defined by the abutment.

In contrast, a smaller abutment 70 or a smaller lever protrusion will permit application of a relatively low degree of torque.

Figure 5:
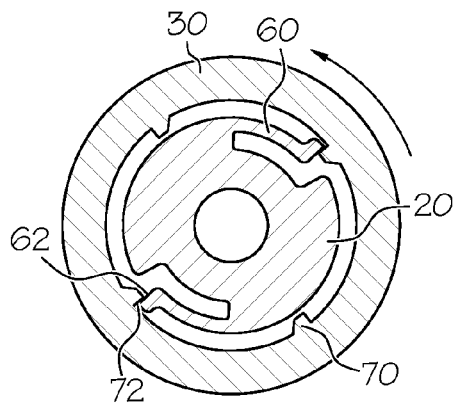
FIG. 5 is an illustration of an embodiment of a torque fitting according to the present invention wherein engagement between the abutment and the lever forces the threaded body portion to rotate in a decompressive direction of rotation with the torque-limiting body portion.

As shown in FIG. 5, the engagement of the first and second arresting surfaces 62, 72 forces the threaded body portion 20 to rotate with the torque-limiting body portion 30 when the torque-limiting body portion 30 rotates in the decompressive direction of rotation. Stated differently, the first and second arresting surfaces 62, 72 are configured to arrest relative rotation between the threaded body portion 20 and the torque-limiting body portion 30 when the arresting surfaces 62, 72 are engaged.

Figure 11:
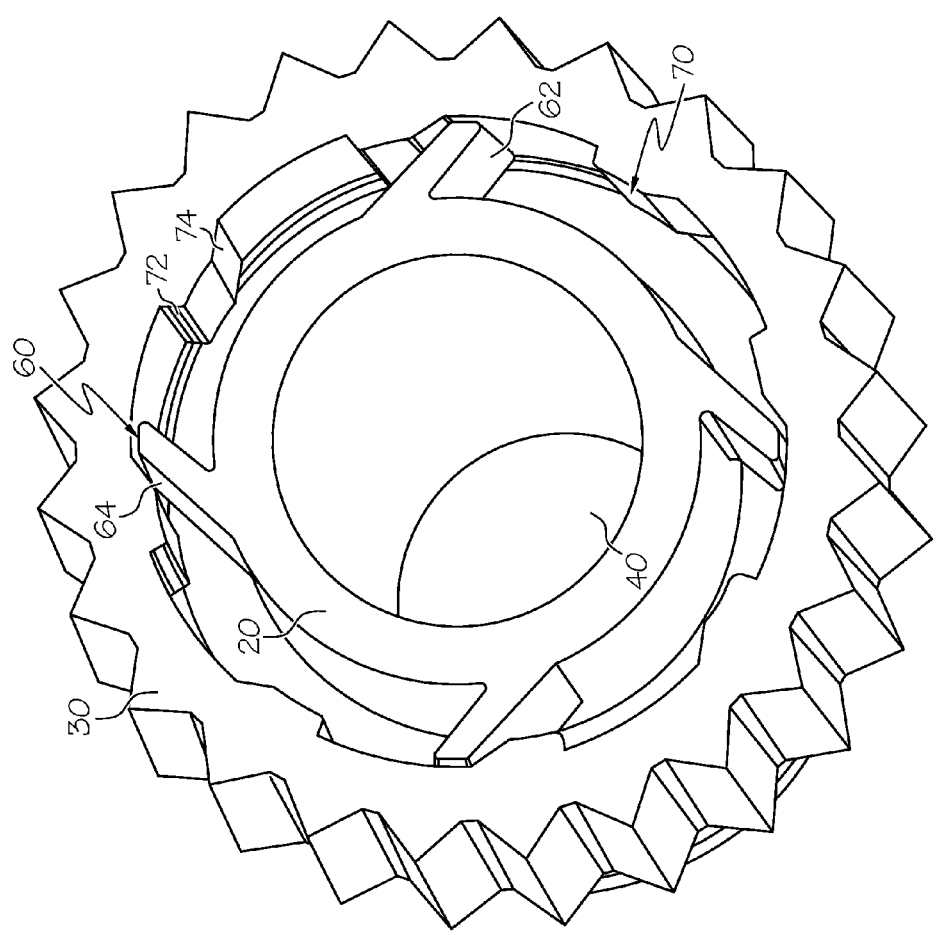
FIG. 11 is an illustration of another embodiment of a torque fitting according to the present invention wherein an engagement between an abutment and a lever forces the threaded body portion to rotate with the torque-limiting body portion and wherein a deflection of the lever by the abutment fails to force the threaded body portion to rotate with the torque-limiting body portion.

In defining the present invention, reference is made to a condition where the lever 60 bypasses the abutment 70. This recitation should not be taken to require that the torque limiting body portion 30 comprises the lever 60. Rather, the bypass condition is merely utilized herein to relate to a condition of relative motion between the lever 60 and abutment 70, when a threshold level of torque is reached, without regard to which body portion comprises the lever 60. It is further contemplated by the present invention that the threaded body portion 20 may comprise the abutment 70, while the torque-limiting body portion 30 may comprise the lever 60. The present invention also contemplates that a body portion of the fitting 10 may comprise more than one lever 60, while the other body portion of the fitting 10 may comprise more than one abutment 70. Further, the threaded body portion 20 may be configured such that the mechanical thread 22 may be positioned on an exterior surface, an interior surface, or both, of the threaded body portion 20. It is contemplated that the embodiment illustrated in FIG. 11 is simply a variation from the embodiment shown in FIGS. 3-5, but that operates in much the same way as that described herein with respect to FIGS. 3-5.

Figure 8:
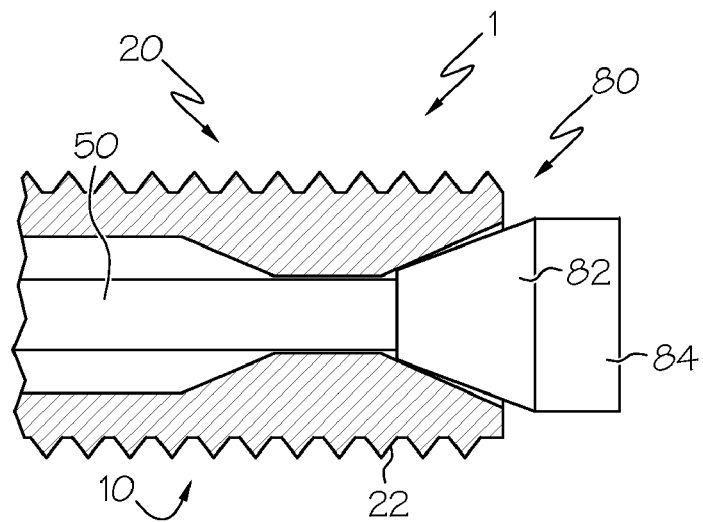
FIG. 8 is an illustration of another embodiment of an assembly according to the present invention wherein the assembly comprises a compressible inverted cone ferrule.
Figure 9:
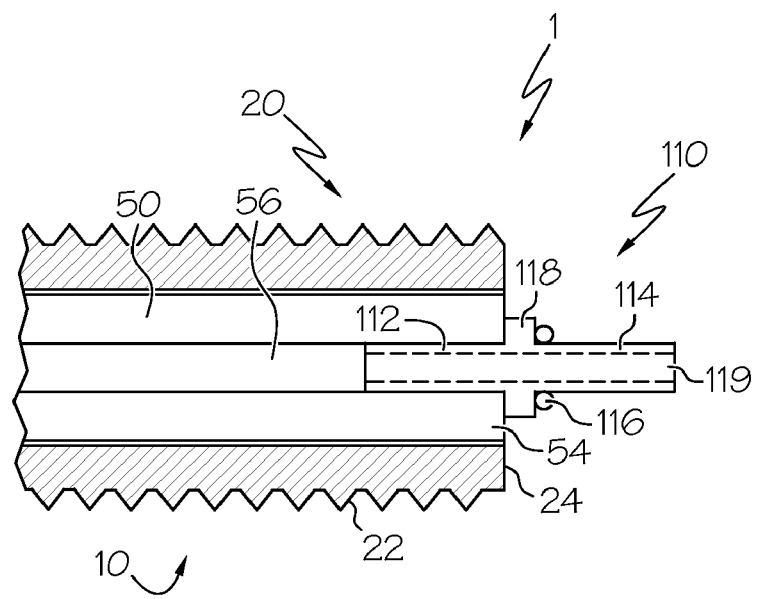
FIG. 9 is an illustration of another embodiment of an assembly according to the present invention wherein the assembly comprises a compressible insert ferrule.

Referring again to FIGS. 1 and 2, the threaded body portion 20 of the fitting 10 may further comprise an end that comprises a compressing edge 24. This compressing edge 24 may be configured as comprising a flat face on the underside of the threaded body portion 20, as shown in FIG. 9, as comprising an inverted bore, as shown in FIGS. 6B, 7B, and 7C, or as comprising a divergent inverted face, as shown in FIGS. 8 and 10. As such, the compressing edge 24 may be configured to cooperate with a compressible ferrule applied to an end of the length of tubing 50.

FIGS. 6B-10 illustrate various embodiments of an assembly 1 comprising a torque fitting 10, a length of tubing 50, and a compressible ferrule. As shown in FIGS. 6B-10, the length of tubing 50 is accommodated by the channel 40 of the torque fitting 10 and a compressible ferrule is applied to an end of the length of tubing 50 such that the compressible ferrule is positioned to cooperate with the torque fitting 10 to prevent substantial fluid leakage when the assembly 1 is applied to a fluid-handling device 120. As shown in FIG. 10, as the fitting 10 rotates in the compressive direction of rotation, it compresses the compressible ferrule 80 against a surface of the port 122 of the fluid-handling device 120. The compression of the compressible ferrule by the fitting 10 generally is enabled by the port's composition of a threaded surface 124 that corresponds with the mechanical thread 22 of the threaded body portion 20. As used herein, "compressible ferrule" means any sealing device compressible to a degree sufficient to prevent substantial fluid leakage about the ferrule itself and/or an end of a length of tubing when the assembly 1 is applied to a fluid-handling device. For example, but not by way of limitation, the compressible ferrule may be a cone ferrule, an inverted cone ferrule, a collared ferrule, a sleeved ferrule, an insert ferrule, a gasket, an o-ring, or other compressible sealing device, or combinations thereof. The compressible ferrule generally is configured such that at least a portion of the compressible ferrule is radially compressible under a degree of compression. It is contemplated, however, that the compressible ferrule may also, or alternatively, be configured such that at least a portion of the compressible ferrule compresses other than radially when under a degree of compression.

Figure 6A:
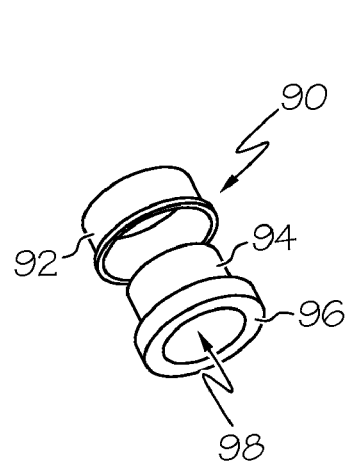
FIGS. 6A-6C are illustrations of an embodiment of an assembly according to the present invention wherein the assembly comprises a compressible collared ferrule.
Figure 6B:
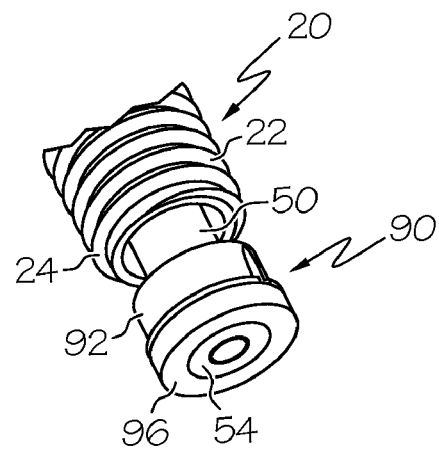
Figure 6C:
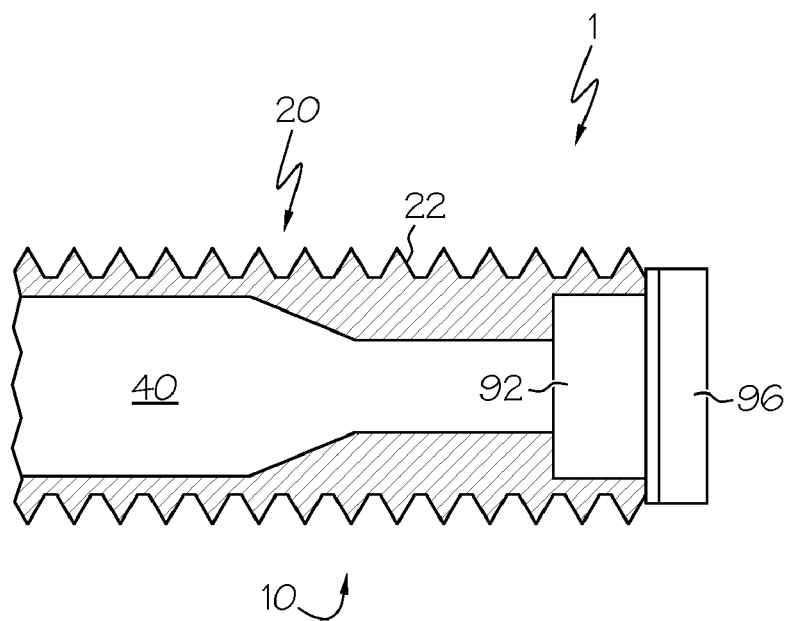

According to one embodiment, shown in FIGS. 6A-6C, the assembly 1 comprises a compressible collared ferrule 90. The compressible collared ferrule 90 may comprise a lock ring 92, a compressible body portion 94, a compressible flared end portion 96, and a channel 98. The channel 98 defines a cross-sectional area sufficient to accommodate the length of tubing 50. The lock ring 92, meanwhile, is configured to clamp about an exterior surface of the compressible body portion 94 with the application of an appropriate degree of compression such that the compressible body portion 94 grips an exterior surface of the length of tubing 50. This degree of compression generally is sufficient to cause the body portion 94 to grip the exterior surface of the length of tubing 50, but insufficient to cause the channel 56 of the length of tubing 50 to collapse. The gripping of the length of tubing 50 localizes the compressible ferrule 90 to the area of the length of tubing 50 to which the ferrule 90 is applied to prevent substantial fluid leakage about the compressible ferrule 90 and/or the length of tubing 50 when the assembly 1 is applied to a fluid-handling device 120.

As such, the assembly 1, shown in FIGS. 6B and 6C, is configured such that the end 54 of the length of tubing 50 is accommodated by the channel 98 of the compressible collared ferrule 90. The lock ring 92 is clamped about the exterior surface of the compressible body portion 94 such that the compressible body portion 94 grips the exterior surface of the end 54 of the length of tubing 50. Further, the compressible collared ferrule 90 is positioned such that the lock ring 92 and the compressing edge 24 of the threaded body portion 20 of the torque fitting 10 cooperate to compress the compressible flared end portion 96 of the compressible ferrule 90 to prevent substantial fluid leakage when the assembly 1 is applied to a fluid-handling device.

Figure 7A:
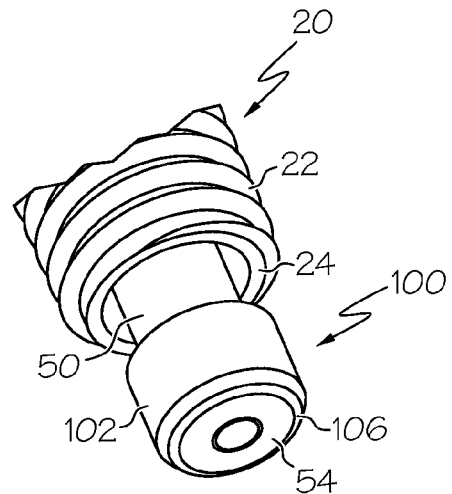
FIGS. 7A-7C are illustrations of another embodiment of an assembly according to the present invention wherein the assembly comprises a compressible sleeved ferrule.
Figure 7B:
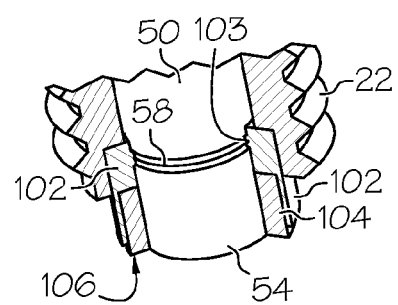
Figure 7C:
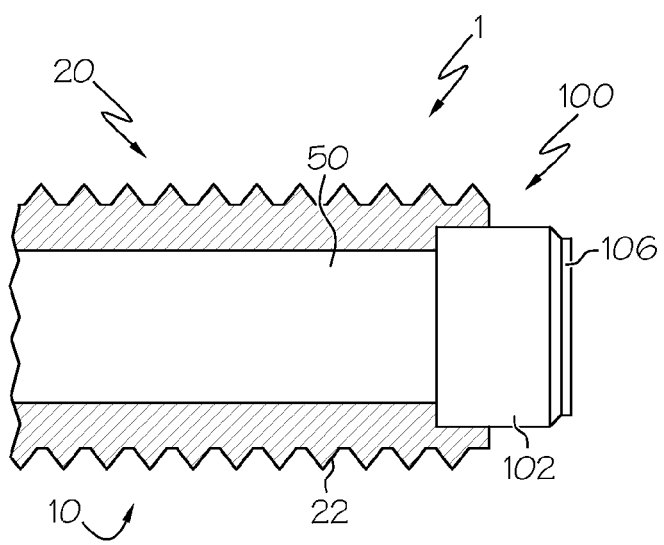

According to another embodiment, shown in FIGS. 7A-7C, the assembly 1 comprises a compressible sleeved ferrule 100. The compressible sleeved ferrule 100 generally comprises a casing 102, a compressible portion 104, and a channel. The casing 102 may be configured to encase a substantial portion of the compressible portion 104 and to engage the exterior surface of the length of tubing 50 such that the compressible portion 104 grips the exterior surface of the length of tubing 50. As shown in FIG. 7B, the casing 102 may comprise a barb 103, or other cutting, device, that is configured to cut a groove 58 into the exterior surface of the length of tubing 50. Once the groove 58 is cut into the exterior surface of the length of tubing 50, the barb 103 generally catches in the groove 58 such that the casing 102 is securely engaged to the length of tubing 50. As also shown in FIG. 7B, the compressible portion 104 of the compressible sleeved ferrule 100 comprises a compressible sealing end 106 exposed from the casing 102. Meanwhile, the channel defines a cross-sectional area sufficient to accommodate the length of tubing 50.

FIGS. 7A-7C illustrate that the assembly 1 is configured such that the end 54 of the length of tubing 50 is accommodated by the channel of the compressible sleeved ferrule 100 and the casing 102 of the compressible ferrule 100 is engaged to the end 54 of the length of tubing 50. Thereby, the compressible ferrule 100 is positioned such that the casing 102 of the compressible ferrule 100 and the compressing edge 24 of the threaded body portion 20 of the torque fitting 10 cooperate to compress the compressible sealing end 106 of the compressible portion 104 of the compressible ferrule 100 to prevent substantial fluid leakage when the assembly 1 is applied to a fluid-handling device.

According to another embodiment, shown in FIG. 8, the assembly 1 comprises a compressible inverted cone ferrule 80. Here, the assembly 1 is configured such that the compressible ferrule 80 comprises a cone-shaped portion 82, a sealing portion 84, and a channel defining a cross-sectional area sufficient to accommodate the length of tubing 50. The assembly 1 further is configured such that the end 54 of the length of tubing 50 is accommodated by the channel of the compressible ferrule 80. An end of the channel 40 of the torque fitting 10 adjacent to the compressing edge 24 of the threaded body portion 20 is configured to accommodate at least a portion of the cone-shaped portion 82 of the compressible ferrule 80. Thereby, the compressible ferrule 80 is positioned to cooperate with the torque fitting 10 to compress the cone-shaped portion 82 of the compressible ferrule 80 to grip the end 54 of the length of tubing 50 and to compress the sealing portion 84 of the compressible ferrule 80 to prevent substantial fluid leakage when the assembly 1 is applied to a fluid-handling device, as illustrated in FIG. 10.

According to yet another embodiment, shown in FIG. 9, the assembly 1 comprises a compressible insert ferrule 110. The assembly 1 is configured such that the compressible insert ferrule 110 comprises an inserting portion 112, a coupling portion 114, a compressible portion 116, a rim 118 defining a separation between the inserting portion 112 and the coupling portion 114, and a channel 119 oriented along the longitudinal axis of the compressible insert ferrule 110. The inserting portion 112 of the compressible ferrule 110 is inserted into a channel 56 at the end 54 of the length of tubing 50, while the coupling portion 114 of the compressible ferrule 110 is positioned to couple the length of tubing 50 to a fluid-handling device. The channel 119 of the compressible ferrule 110 is configured to permit the passage of fluids therethrough. Thereby, fluids may pass from a fluid-handling device coupled to the compressible ferrule 110, through the channel 119 of the ferrule 110, and into the channel 56 of the length of tubing 50, and, alternatively, fluids may pass in the opposite direction from the channel 56 of the length of tubing 50, through the channel 119 of the ferrule 110, and into a fluid-handling device. The compressible portion 116 of the compressible ferrule 110 is positioned about an exterior surface of the coupling portion 114 and abutting substantially against the rim 118. The rim 118, meanwhile, is positioned to cooperate with the compressing edge 24 of the threaded body portion 20 of the torque fitting 10 to compress the compressible portion 116 to prevent substantial fluid leakage when the assembly 1 is provided to a fluid-handling device.

It is contemplated that one or a combination of any varieties of compressible ferrules may be incorporated into embodiments of the assemblies of the present invention. The embodiments described herein are not intended to be limiting and the assemblies defined by the appended claims are not to be limited in construction to the compressible ferrules described herein and/or illustrated in the accompanying figures.

It is noted that terms like "generally" and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "assembly" is utilized herein to represent a combination of components and individual components, regardless of whether the components are combined with other components. For example, an "assembly" according to the present invention may comprise a fluid manifold having a port and a gasket, o-ring, or other sealing device in addition to a torque fitting 10 according to the present invention, a length of tubing 50, and a compressible ferrule.

For the purposes of describing and defining the present invention it is noted that the terms "substantial" and "substantially" are utilized herein to represent the inherent degree of uncertainty that may be attributed to any quantitative comparison, value, measurement, or other representation. The terms "substantial" and "substantially" are also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention described herein and defined in the appended claims. More specifically, although some aspects of the present invention may be identified herein as preferred or particularly advantageous, it is contemplated that the present invention is not necessarily limited to these preferred aspects of the invention.

What is claimed is:

1. An assembly comprising a torque fitting, a length of tubing, and a compressible ferrule, wherein:
    the torque fitting comprises a threaded body portion, a torque-limiting body portion, and a channel;
    the threaded body portion and the torque-limiting body portion are arranged concentrically along a longitudinal axis of the torque fitting;
    the channel of the torque fitting extends through the torque fitting from a first opening defined in the threaded body portion to a second opening defined in the threaded body portion;
    the channel of the torque fitting is oriented along the longitudinal axis of the torque fitting and defines a cross-sectional area sufficient to accommodate the length of tubing along the longitudinal axis;
    the threaded body portion comprises a compressing edge on the underside of the threaded body portion adjacent to the second opening and a mechanical thread defining a compressive direction of rotation and a decompressive direction of rotation;
    the threaded body portion and the torque-limiting body portion are configured such that,
        below a threshold level of torque applied to the torque-limiting body portion, rotation of the torque-limiting body portion in the compressive direction of rotation forces the threaded body portion to rotate with the torque-limiting body portion,
        above the threshold level of torque applied to the torque-limiting body portion, rotation of the torque-limiting body portion in the compressive direction of rotation fails to force the threaded body portion to rotate with the torque-limiting body portion, such that the torque-limiting body portion continues to rotate in the compressive direction of rotation but the threaded body portion fails to rotate, and
        rotation of the torque-limiting body portion in the decompressive direction of rotation forces the threaded body portion to rotate with the torque-limiting body portion,
    one of the threaded body portion or the torque-limiting body portion comprises a lever having a first arresting surface and a yielding surface, and the other of the threaded body portion or the torque-limiting body portion comprises an abutment having a second arresting surface and an engaging surface;
    the lever and the abutment are configured such that, when torque above the threshold level is applied by rotating the torque-limiting body portion in the compressive direction of rotation, the engaging surface contacts the yielding surface, the lever flexes toward the body portion comprising the lever and away from the body portion comprising the abutment, and the lever bypasses the abutment;
    the length of tubing is accommodated by the channel of the torque fitting, such that the length of tubing extends through both the first opening and the second opening; and
    the compressible ferrule is applied to an end of the length of tubing such that the compressible ferrule is positioned to cooperate with the compressing edge to prevent fluid leakage when the assembly is applied to a fluid-handling device.

2. The assembly of claim 1, wherein the lever and the abutment are configured such that the engaging surface and the yielding surface engage when torque below the threshold level is applied in rotating the torque-limiting body portion in the compressive direction of rotation.

3. The assembly of claim 1, wherein the first arresting surface of the lever and the second arresting surface of the abutment are configured to engage such that rotation of the torque-limiting body portion in the decompressive direction of rotation forces the threaded body portion to rotate with the torque-limiting body portion.

4. The assembly of claim 1, wherein the mechanical thread is positioned on an exterior surface of the threaded body portion.

5. The assembly of claim 1, wherein:
    the assembly further comprises a fluid-handling device comprising a port; and
    the compressible ferrule is positioned to cooperate with the torque fitting to prevent fluid leakage at a ferrule/port interface.

6. The assembly of claim 1, wherein the assembly is configured such that:
    the compressible ferrule comprises a cone-shaped portion, a sealing portion, and a channel defining a cross-sectional area sufficient to accommodate the length of tubing;
    the end of the length of tubing is accommodated by the channel of the compressible ferrule; and
    an end of the channel of the torque fitting adjacent to the compressing edge of the threaded body portion is configured to accommodate at least a portion of the cone-shaped portion of the compressible ferrule such that the compressible ferrule is positioned to cooperate with the torque fitting to compress the cone-shaped portion of the compressible ferrule to grip the end of the length of tubing and to compress the sealing portion of the compressible ferrule to prevent fluid leakage when the assembly is applied to the fluid-handling device.

7. The assembly of claim 1, wherein:
the compressible ferrule comprises a lock ring, a compressible body portion, a compressible flared end portion, and a channel;
the lock ring is configured to clamp about an exterior surface of the compressible body portion such that the compressible body portion grips an exterior surface of the length of tubing; and
the channel of the compressible ferrule defines a cross-sectional area sufficient to accommodate the length of tubing.

8. The assembly of claim 7, wherein the assembly is configured such that:
the end of the length of tubing is accommodated by the channel of the compressible ferrule;
the lock ring is clamped about the exterior surface of the compressible body portion such that the compressible body portion grips the exterior surface of the end of the length of tubing; and
the compressible ferrule is positioned such that the lock ring of the compressible ferrule and the compressing edge of the threaded body portion of the torque fitting cooperate to compress the compressible flared end portion of the compressible ferrule to prevent fluid leakage when the assembly is applied to the fluid-handling device.

9. The assembly of claim 1, wherein:
the compressible ferrule comprises a casing, a compressible portion, and a channel;
the casing is configured to encase a substantial portion of a compressible portion and to engage the exterior surface of the length of tubing such that the compressible portion grips the exterior surface of the length of tubing;
the compressible portion comprises a compressible sealing end exposed from the casing; and
the channel of the compressible ferrule defines a cross-sectional area sufficient to accommodate the length of tubing.

10. The assembly of claim 9, wherein the assembly is configured such that:
the end of the length of tubing is accommodated by the channel of the compressible ferrule;
the casing of the compressible ferrule is engaged to the end of the length of tubing;
the compressible ferrule is positioned such that the casing of the compressible ferrule and the compressing edge of the threaded body portion of the torque fitting cooperate to compress the compressible sealing end of the compressible portion of the compressible ferrule to prevent fluid leakage when the assembly is applied to the fluid-handling device.

11. The assembly of claim 1, wherein the assembly is configured such that:
the compressible ferrule comprises an inserting portion, a coupling portion, a compressible portion, a rim defining a separation between the inserting portion and the coupling portion, and a channel oriented along the longitudinal axis of the compressible ferrule;
the inserting portion of the compressible ferrule is inserted into a channel at the end of the length of tubing;
the coupling portion of the compressible ferrule is positioned to couple the length of tubing to the fluid-handling device;
the channel of the compressible ferrule is configured to permit the passage of fluids therethrough;
the compressible portion of the compressible ferrule is positioned about an exterior surface of the coupling portion and abuts the rim; and
the rim is positioned to cooperate with the compressing edge of the threaded body portion of the torque fitting to compress the compressible portion to prevent fluid leakage when the assembly is provided to the fluid-handling device.

12. The assembly of claim 1, wherein the compressible ferrule is configured such that at least a portion of the compressible ferrule is radially compressible under a degree of compression.

13. The assembly of claim 1, wherein the threaded body portion comprises the lever and the torque-limiting body portion comprises the abutment.

14. The assembly of claim 13, wherein the threaded body portion is configured such that when the lever bypasses the abutment, the cross-sectional area of the channel does not change.

15. An assembly comprising a torque fitting, a length of tubing, and a compressible ferrule, wherein:
the torque fitting comprises a threaded body portion, a torque-limiting body portion, and a channel;
the threaded body portion comprises a compressing edge on the underside of the threaded body portion;
the threaded body portion comprises mechanical threads on an outer surface of the threaded body portion;
the threaded body portion and the torque-limiting body portion are arranged concentrically along a longitudinal axis of the fitting;
the channel is oriented along the longitudinal axis of the fitting and defines a cross-sectional area sufficient to accommodate the length of tubing along the longitudinal axis;
the threaded body portion comprises a lever;
the torque-limiting body portion comprises an abutment;
the lever comprises a first arresting surface and a yielding surface;
the abutment comprises a second arresting surface and an engaging surface;
the lever and the abutment are configured such that the yielding surface of the lever and the engaging surface of the abutment engage when torque below a threshold level is applied in rotating the torque-limiting body portion in a compressive direction of rotation;
the lever and the abutment are further configured such that the engaging surface contacts the yielding surface and the lever deflects an amount sufficient to allow the lever to bypass the abutment when torque above the threshold level is applied in rotating the torque-limiting body portion in the compressive direction of rotation;
the deflection of the lever by the abutment causes the lever to flex toward the threaded body portion and away from the torque-limiting body portion;
the lever is configured with a degree of elasticity sufficient to enable repetitive flexion of the lever;
the threaded body portion is configured such that when the lever bypasses the abutment, the cross-sectional area of the channel does not change;
the first and second arresting surfaces are configured to arrest relative rotation between the threaded body portion and the torque-limiting body portion when engaged;
the length of tubing is accommodated by the channel of the torque fitting; and
the compressible ferrule is applied to an end of the length of tubing such that the compressible ferrule is positioned to cooperate with the torque fitting to prevent fluid leakage when the assembly is applied to a fluid-handling device having an interiorly disposed threaded surface.

16. The assembly of claim 15, wherein:
the assembly further comprises the fluid-handling device, and the fluid-handling device comprises a port; and
the compressible ferrule is positioned to cooperate with the torque fitting to prevent fluid leakage at an interface of the ferrule with the port.

17. The assembly of claim 15, wherein the assembly is configured such that:
the compressible ferrule comprises a cone-shaped portion, a sealing portion, and a channel defining a cross-sectional area sufficient to accommodate the length of tubing;
the end of the length of tubing is accommodated by the channel of the compressible ferrule; and
an end of the channel of the torque fitting adjacent to the compressing edge of the threaded body portion is configured to accommodate at least a portion of the cone-shaped portion of the compressible ferrule such that the compressible ferrule is positioned to cooperate with the torque fitting to compress the cone-shaped portion of the compressible ferrule to grip the end of the length of tubing and to compress the sealing portion of the compressible ferrule to prevent fluid leakage when the assembly is applied to the fluid-handling device.

18. The assembly of claim 15, wherein:
the compressible ferrule comprises a lock ring, a compressible body portion, a compressible flared end portion, and a channel;
the lock ring is configured to clamp about an exterior surface of the compressible body portion such that the compressible body portion grips an exterior surface of the length of tubing; and
the channel of the compressible ferrule defines a cross-sectional area sufficient to accommodate the length of tubing.

19. The assembly of claim 18, wherein the assembly is configured such that:
the end of the length of tubing is accommodated by the channel of the compressible ferrule;
the lock ring is clamped about the exterior surface of the compressible body portion such that the compressible body portion grips the exterior surface of the end of the length of tubing; and
the compressible ferrule is positioned such that the lock ring of the compressible ferrule and the compressing edge of the threaded body portion of the torque fitting cooperate to compress the compressible flared end portion of the compressible ferrule to prevent fluid leakage when the assembly is applied to the fluid-handling device.

20. The assembly of claim 15, wherein:
the compressible ferrule comprises a casing, a compressible portion, and a channel;
the casing is configured to encase a substantial portion of a compressible portion and to engage the exterior surface of the length of tubing such that the compressible portion grips the exterior surface of the length of tubing;
the compressible portion comprises a compressible sealing end exposed from the casing; and
the channel of the compressible ferrule defines a cross-sectional area sufficient to accommodate the length of tubing.

21. The assembly of claim 20, wherein the assembly is configured such that:
the end of the length of tubing is accommodated by the channel of the compressible ferrule;
the casing of the compressible ferrule is engaged to the end of the length of tubing;
the compressible ferrule is positioned such that the casing of the compressible ferrule and the compressing edge of the threaded body portion of the torque fitting cooperate to compress the compressible sealing end of the compressible portion of the compressible ferrule to prevent fluid leakage when the assembly is applied to the fluid-handling device.

22. The assembly of claim 15, wherein the assembly is configured such that:
the compressible ferrule comprises an inserting portion, a coupling portion, a compressible portion, a rim defining a separation between the inserting portion and the coupling portion, and a channel oriented along the longitudinal axis of the compressible ferrule;
the inserting portion of the compressible ferrule is inserted into a channel at the end of the length of tubing;
the coupling portion of the compressible ferrule is positioned to couple the length of tubing to the fluid-handling device;
the channel of the compressible ferrule is configured to permit the passage of fluids therethrough;
the compressible portion of the compressible ferrule is positioned about an exterior surface of the coupling portion and abuts the rim; and
the rim is positioned to cooperate with the compressing edge of the threaded body portion of the torque fitting to compress the compressible portion to prevent fluid leakage when the assembly is provided to the fluid-handling device.

23. The assembly of claim 15, wherein the compressible ferrule is configured such that at least a portion of the compressible ferrule is radially compressible under a degree of compression.

* * * * *